Dec. 19, 1944.  A. H. LOCKHEED  2,365,419
TENSION INDICATING WRENCH
Filed June 23, 1943
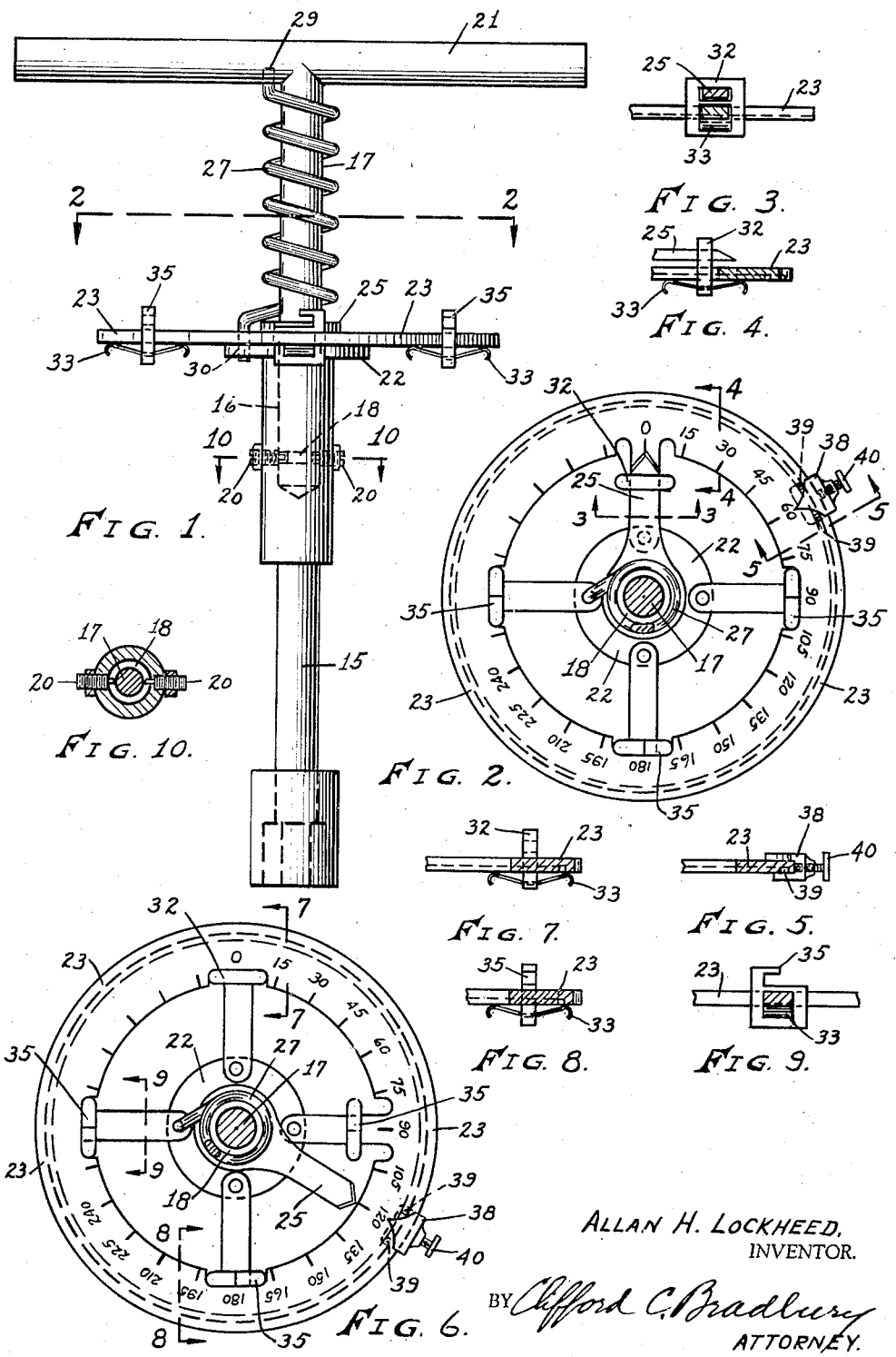
ALLAN H. LOCKHEED,
INVENTOR.
BY Clifford C. Bradbury
ATTORNEY.

Patented Dec. 19, 1944

2,365,419

UNITED STATES PATENT OFFICE 2,365,419

TENSION INDICATING WRENCH

Allan H. Lockheed, Grand Rapids, Mich.

Application June 23, 1943, Serial No. 491,906

3 Claims. (Cl. 73—139)

My invention relates to tension indicating wrenches of the type in which provision is made to indicate the torque being applied to the nut, bolt or screw being tightened by the operator.

In order to avoid excessive rotation of the operating handle before the necessary torque has been built up in a yielding mechanism, I provide a plurality of initial positions for the indicator, each position representing an initial amount of stored spring torsion. The actual amount of torque to be supplied to the nut, bolt or screw is indicated on a dial by figures representing foot ounces, foot pounds, or any other desired units. I provide a pointer for indicating the torque to be applied and an indicating hand moving adjacent the dial which arrives at the pointer when the torque indicated at the pointer has been reached.

The objects of my invention are to provide a simple durable and inexpensive torque indicating wrench wherein a plurality of initial settings may be made by the simple expedient of adjusting the proper stop to prevent the indicating hand from returning beyond the particular adjusted stop toward the zero torque position.

My invention is illustrated in the accompanying drawing, in which

Fig. 1 is an elevation.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a plan of the dial with the pointer set at 120 units of torque and the indicating hand moved against the spring tension to the same position.

Fig. 7 is a section taken on the line 7—7 of Fig. 6.

Fig. 8 is a section taken on the line 8—8 of Fig. 6.

Fig. 9 is a section taken on the line 9—9 of Fig. 6, and

Fig. 10 is a section taken on the line 10—10 of Fig. 1.

In its preferable form my indicating wrench includes an integral socket and shaft 15, the upper end of the shaft being recessed at 16 to receive the lower end of the handled stem 17. The stem 17 is provided with a circumferential groove 18 into which one or more screws 20 project to retain the stem 17 rotatably in position within the hollow portion of the shaft 15. A hub 22 and spoked dial 23 suitably attached thereto are fixedly attached to the upper end of the shaft 15. This attachment may be made by splining the shaft 15 and hub 22 or by any other suitable method of attachment such as welding or peening. An indicating hand 25 is suitably attached to the stem 17 so that it rotates with the stem and handle slightly above the dial 23. A spring 27 surrounds the stem 17 and at one end enters a hole 29 in the underside of the handle and at the other end enters a hole 30 which extends through one of the spokes of the dial 23 and the hub 22. When the handle 21 is rotated in a clockwise direction the spring 27 applies torque to the hub 22 and the socketed shaft 15.

The spoke of the dial 23 extending from the zero torque position of the dial is provided with a slip-lock 32 having two rectangular openings therethrough, one of the size to receive the spoke and the other of a size to receive the indicator 25. The slip-lock 32 is frictionally held against accidental movement along the spoke by a leaf spring 33 which engages the underside of the spoke.

Each of the other three spokes of the dial 23 is provided with a slip-lock 35 similarly shaped, excepting that it has a portion cut away as shown in Fig. 9 to permit the indicating hand to move away from the slip-lock in the clockwise direction. When the slip-lock on the spoke opposite zero torque is moved so as to engage the indicator hand 25, the stem 17 and shaft 15 are locked together so that the wrench may be used the same as any ordinary solid socket wrench. When any of the other three slip-locks is moved inwardly along its spoke the indicating hand will be retained at this position against counter-clockwise rotation beyond that particular spoke. Movement of the indicator hand in a clockwise direction, however, will occur whenever torque in excess of that initially put into the spring 27 is applied to the shaft 17 in a clockwise direction.

When my wrench is used for loosening nuts or bolts having right hand threads any one of the slip-locks 32 or 35 will prevent counter-clockwise movement between the stem 17 and the shaft 15.

If desired, a pointer 38 fitting over the rim of the dial 23 may be used to indicate the final torque to be applied by the operator. The pointer is preferably provided with a pair of pins 39 which fit into a circumferential groove in the underside of the dial. The pointer may be held in place by a thumb screw 40 which engages the periphery of the dial.

While I have shown and described my invention as comprising certain details of construction, it is to be understood that certain variations of these constructions may be made without departing from the spirit or scope of my invention.

I claim:

1. In a torque indicating wrench, an operating member and a socket member axially journaled together, a dial carried by one of the members, an indicator carried by the other member, a spring through which torque is transmitted from one member to the other permitting relative rotary movement of the indicator and dial corresponding to the torque applied through the spring, a plurality of spokes for the dial, slip-stops on a plurality of said spokes adapted to be moved along the spokes to positions for engagement with the indicator for retaining in the spring an initial torque, at least one of said slip-stops serving to lock the indicator against movement in either direction relative to the dial, and at least one of said slip-stops permitting movement of the indicator relative to the dial in one direction of rotation but preventing movement of the indicator relative to the dial in the other direction of rotation.

2. In a torque indicating wrench, an operating member and a socket member axially journaled together, a dial carried by the socket member, an indicator carried by the operating member, a spring having one end attached to the operating member and the other end attached to the socket member whereby it is wound and unwound by relative rotary movement of the indicator and dial in clockwise and counter-clockwise rotation respectively, and a pointer carried by the dial and movable to the position of ultimate desired torque to be indicated by the pointer, and means to retain in the spring varying amounts of initial torque whereby the relative rotation of the operating member and the socket member may be limited to a small angle in which the ultimate desired torque is to be indicated.

3. In a torque indicating wrench, an operating member and a socket member axially journaled together, a spring surrounding a portion of the operating member having one end attached thereto and the other end attached to the socket member, a hub attached to the socket member, an indicating dial having spokes attached to said hub, an indicator carried by the operating member, a slip-stop on one of said spokes adapted to be moved along the spoke and having a recess therein for engagement with said indicator, whereby the indicator and dial may be locked together or freed from one another at the will of the operator.

ALLAN H. LOCKHEED.